May 29, 1934.  W. F. KEMP ET AL  1,960,817
AUTOMATIC CHANGE-OVER APPARATUS FOR MOTION PICTURE PROJECTORS
Filed Feb. 3, 1932  4 Sheets-Sheet 3
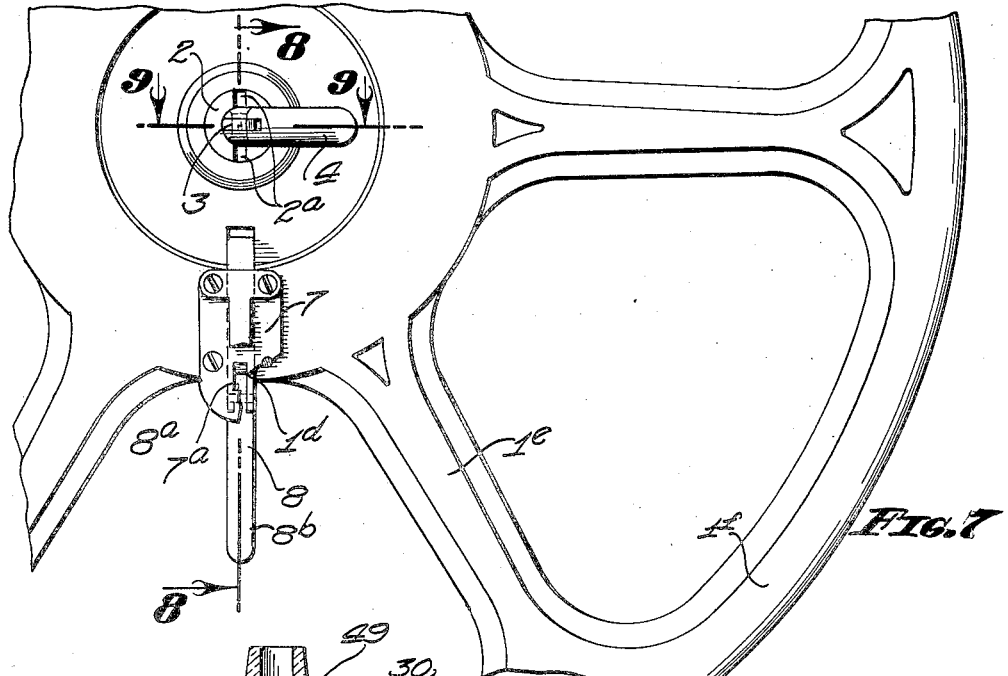
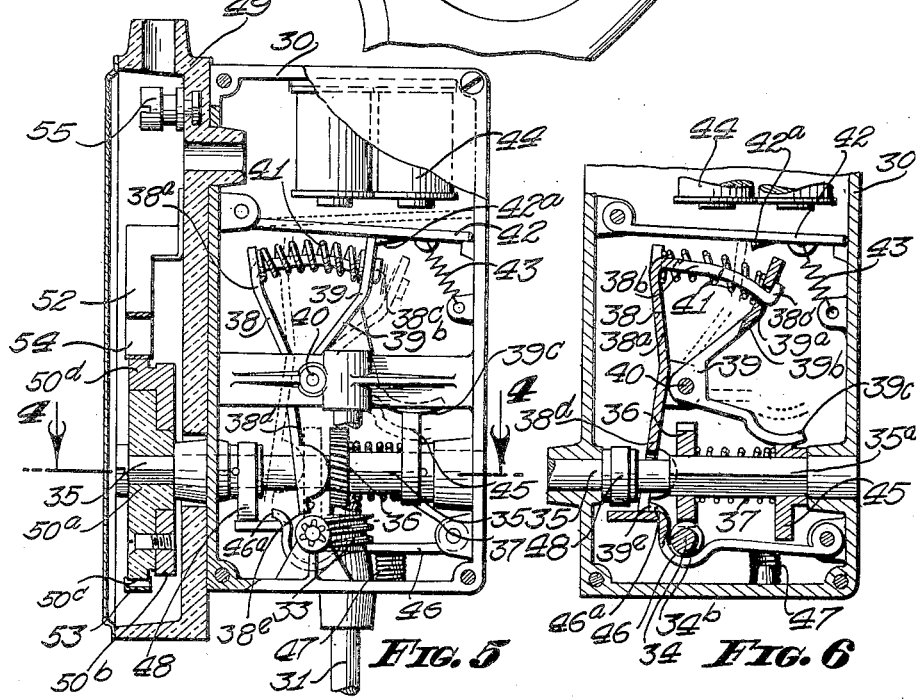
Inventors
WILLIAM F. KEMP
PETER SHEARER
By A. B. Bowman
Attorney

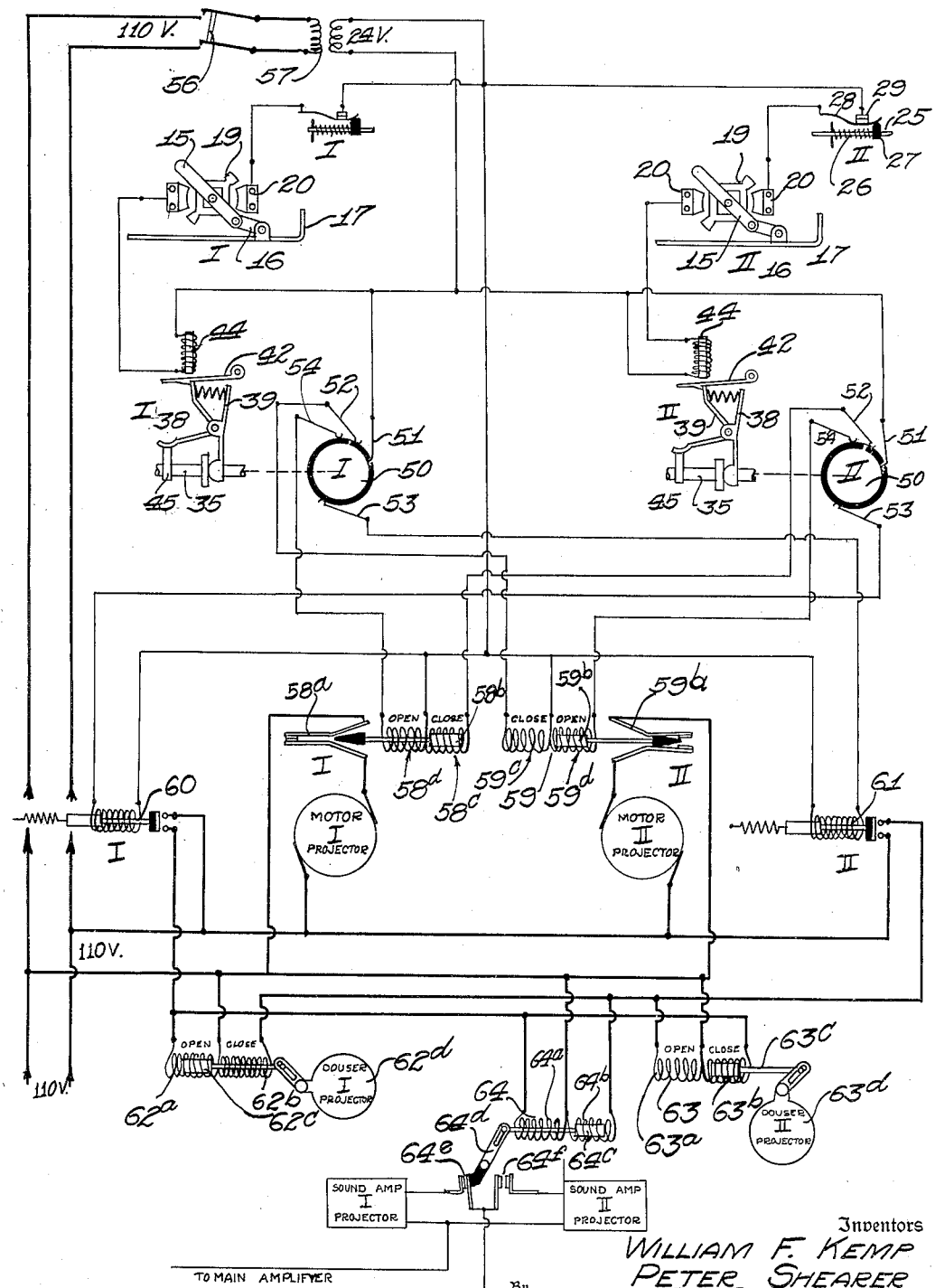

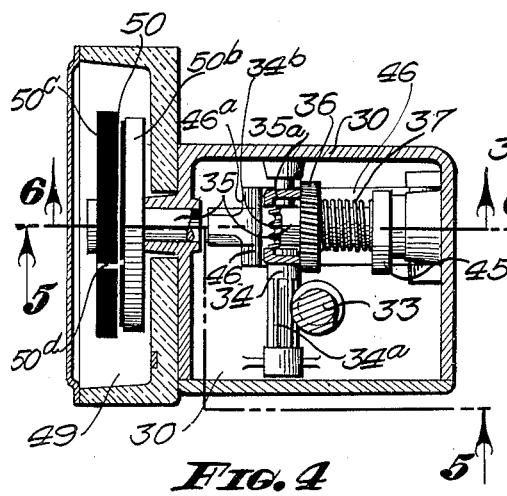

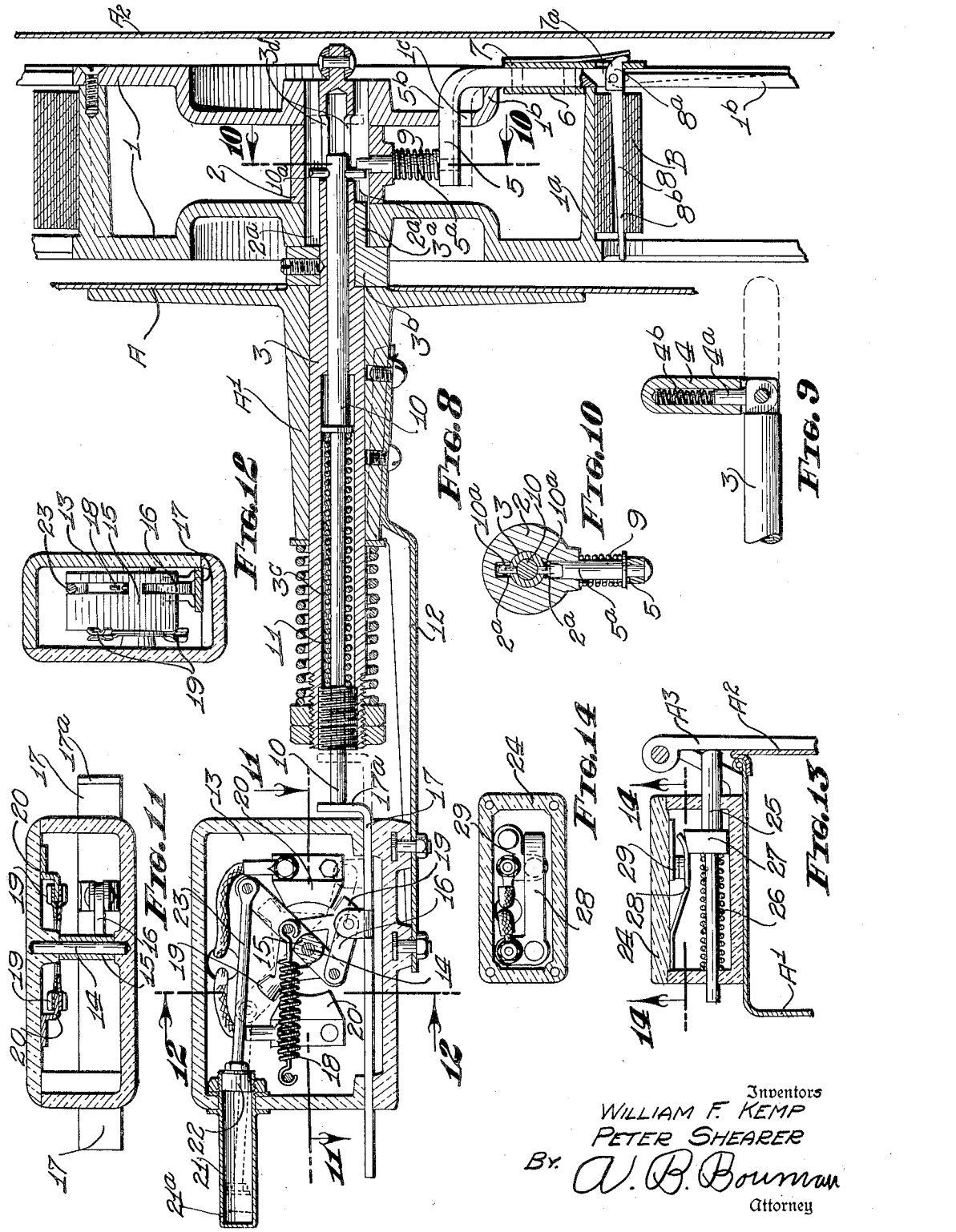

Patented May 29, 1934

1,960,817

UNITED STATES PATENT OFFICE 1,960,817

AUTOMATIC CHANGE-OVER APPARATUS FOR MOTION PICTURE PROJECTORS

William F. Kemp, Santa Ana, and Peter Shearer, San Diego, Calif.

Application February 3, 1932, Serial No. 590,562

13 Claims. (Cl. 88—17)

Our invention relates to automatic change-over apparatus for motion picture projectors, and the objects of our invention are:

First, to provide an apparatus of this class which eliminates the need of cues or marks upon the film in order to manually operate the change-over switches;

Second, to provide an apparatus of this class which, when a motion picture film being projected reaches a predetermined point, automatically starts the motor of the other projector; then operates the dousers of both projectors and, if the machine is so equipped, operates the sound equipment; then shuts off the motor of the first projector;

Third, to provide an apparatus of this class which is set in operation by a novel trip arrangement associated with the unwinding reel of the projector in operation;

Fourth, to provide an apparatus of this class wherein the trip mechanism associated with the motion picture film reel operates regardless of the manner in which the reel is placed in its casing or housing;

Fifth, to provide an apparatus of this class which in no manner interferes with the normal operation of the projectors and which may be installed thereon without requiring changes in the construction of the projectors, thus providing an apparatus which may be installed with a minimum amount of time and trouble upon any make of motion picture projector;

Sixth, to provide an apparatus of this class which may be quickly rendered inoperative so as to permit the change-over to be made manually if desired, thereby ensuring full control of the projector under all conditions or emergencies;

Seventh, to provide an apparatus of this class in which the projectionist is only required to set the trip mechanism when he winds the film upon the reel;

Eighth, to provide an apparatus of this class which accomplishes the change-over operation without a noticeable break in the continuity of the film being projected, and Ninth, to provide on the whole a novelly constructed automatic change-over apparatus for motion picture projectors which is simple of construction proportional to its functions, durable, efficient in its action, and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a diagrammatical view of our changeover apparatus; Fig. 2 is a perspective view of the control mechanism casing showing its association with the shutter shaft of the projector; Fig. 3 is a front elevational view of the control mechanism casing with the cover shown fragmentarily so as to disclose the contact drum and contactors; Fig. 4 is a transverse sectional view of the control mechanism taken through 4—4 of Fig. 5; Fig. 5 is a longitudinal sectional view thereof taken through 5—5 of Fig. 4 with parts and portions shown in elevation to facilitate the illustration; Fig. 6 is a similar though fragmentary sectional view through 6—6 of Fig. 5 showing the operating mechanism in a different position from that illustrated in Fig. 5; Fig. 7 is a fragmentary elevational view of a film reel incorporating our novel trip mechanism; Fig. 8 is a fragmentary sectional view through 8—8 of Fig. 7 showing the film reel in its casing as well as illustrating the switch structure operated by said trip mechanism; Fig. 9 is a fragmentary sectional view of the reel spindle taken through 9—9 of Fig. 8; Fig. 10 is a transverse sectional view through 10—10 of Fig. 8 with parts and portions shown in elevation; Fig. 11 is a sectional view of the switch structure taken through 11—11 of Fig. 8; Fig. 12 is a transverse sectional view of said switch structure taken through 12—12 of Fig. 8; Fig. 13 is a longitudinal sectional view of a safety switch showing adjacent portions of the reel casing; and Fig. 14 is a sectional view thereof through 14—14 of Fig. 13.

Similar characters of reference refer to similar parts and portions throughout the several views of the drawings.

Our automatic change-over apparatus comprises a pair of trip mechanisms each including a film reel 1, hub bushing 2, reel spindle 3, retainer 4, bolt member 5, guide plates 6 and 7, trip lever 8, releasing spring 9, slide bar 10, and spring 11; a pair of switch structures each including a bracket 12, a switch casing 13, a pin 14, switch lever 15, link 16, slide bar 17, spring 18, contactors 19, contact brackets 20, cylinder 21, piston 22, and connecting rod 23; a pair of safety switch mechanisms each including a safety switch casing 24, sliding pin 25, spring 26, contact engaging lug 27, and contacts 28 and 29, a pair of operating mechanisms each including a casing 30, driving shaft 31, flexible connecting means 32, driving worm 33, counter shaft 34, driven shaft 35, sliding gear 36, spring 37, operating levers 38 and 39, pin 40, spring 41, catch member 42, spring 43, magnets 44, re-setting cam 45, retaining lever 46, spring 47, and releasing cam 48; a pair of control switch mechanisms each including a casing 49, contact wheel 50, grounding contactor 51, motor starting contactor 52, douser and sound switching contactor 53, motor stopping contactor 54, and terminals 55; a main switch 56, transformer 57, electrically operated motor switches 58 and 59, electrically operated momentary acting switches 60 and 61, electrically controlled dousers 62 and 63, and electrically controlled sound change-over switch 64.

Most motion picture projectors are used in pairs so that one machine projects one reel of the picture and the other machine the next reel, and so on, in this manner reducing to a minimum any break in the continuity of the motion picture film. Heretofore the change-over from one projector to the other has been accomplished manually, the projectionist watching the projection of the film for a cue in the form of some mark. The projectionist then operates the various switches necessary to shut one projector off and start the other. If the projectionist sees the cue and operates the various switches in the proper timed order, the change-over is accomplished without detection by the audience. However, it is exceedingly difficult to accomplish this.

With out apparatus the change-over operation is begun at the proper time and the various steps are performed in the exact sequential order without the use of cues or the like. The change-over apparatus is set into operation by a trip mechanism. One of these trip mechanisms is provided for each projector and is associated with the reel from which the film is unwound. This film reel, designated 1, is conventional in most respects and fits in a conventional casing A forming a part of the conventional projector.

The film reel 1 is provided with a hub bushing 2 which fits upon a reel spindle 3. The reel spindle 3 is adapted to fit in place of the conventional reel spindle and is journalled in a bearing A1 extending from one side of the casing A. The other side of said casing or reel housing A is provided with a door A2 large enough to receive the film reel. The hub bushing 2 is provided with diametrically disposed channels 2a extending therethrough which form keyways either one of which is adapted to interlock with a suitable key 3a forming a part of a collar 3b mounted upon the reel spindle 3.

The reel and bushing are held upon the spindle by means of a retainer 4. The retainer 4 is illustrated in Figs. 7, 8 and 9, and is hinged to the extremity of the reel spindle 3. The retainer 4 is shiftable from a coaxial relation to a right-angular relation with the reel spindle, as shown best in Fig. 9. Said retainer is held in these positions by a suitable sliding pin 4a which is yieldably held against the extremity of the reel spindle 3 by means of a spring 4b provided in the retainer.

The film reel 1 is provided with a film supporting hub 1a located radially outwardly from the hub bushing 2 thereby forming an annular space therebetween. This space is adapted to receive a portion of a bolt member 5. The bolt member 5 comprises a sliding pin portion 5a which extends through an aperture provided in a side wall of the hub bushing 2. The sliding pin 5a is disposed so that the inner end thereof projects into one of the keyways 2a formed in the hub bushing, preferably at the central portion of said keyway, that is, midway between the extremities of the hub bushing. The radially outward end of the sliding pin portion 5a is secured to an L-shaped bar portion 5b. One leg of said bar portion extends axially outwardly through one of the end members, designated 1b, of the reel through a slot 1c provided therein. The other leg of the bar portion 6b extends radially outwardly into a slot 1d provided in said end member 1b. The end members of the reel 1, similar to the corresponding portions of the conventional film reel, are provided with large openings disposed outwardly from the film carrying hub thereby forming a plurality of radiating spokes 1e connected to a common rim 1f. The slot 1d intersects one of said openings or spaces and the extremity of the bolt member 5 extends therein a short distance. The bolt 5 is held in the slot 1d by means of retaining plates or guide plates 6 and 7 mounted on the axially inner and outer sides, respectively, of the end member 1b.

The extremity of the bolt 5 is bifurcated so as to pivotally support a trip lever 8. The trip lever 8 is pivoted near one end and its shorter arm, designated 8a, is adapted to extend into a slot 7a provided in the guide plate 7 in such a manner that when the trip lever is shifted into angular relation with the bolt member 5 said arm 8a fulcrums in the slot 7a so as to shift the bolt member 5 radially inwardly. The other or remaining arm 8b of the trip lever 8 is relatively flat and long enough to extend through and project slightly beyond the film receiving portion of the reel. The bolt member 5 is provided with a spring 9 positioned around the sliding pin portion 5a and arranged to shift the bolt member 5 axially outwardly. Such a movement tends to shift the trip lever 8 from the solid line to the dotted line position shown in Fig. 8. That is, from an axially extending position to a radially extending position. When said trip lever is in its radially extending position it is within the margins of the end member 1b and therefore clear of the film. The trip lever is set by first winding the film, designated B, about the reel in such a manner that a predetermined point therein comes opposite the trip lever. The trip lever is then manually shifted to the solid line position shown in Fig. 8 and the remaining convolutions of the film wound over, thus retaining the trip lever in the position shown in Fig. 8.

The spindle 3 is provided with a bore 3c terminating near the retainer 4 and extending to the other rearward end of said spindle. The bore 3c slidably receives a slide bar 10. The inner end of the slide bar 10 is provided with a pin 10a, the extremities of which fit in the keyway or channel 2a so that either end of the pin 10a may be engaged by the axially inward extremity of the bolt member 5 when said extremity projects into the keyway 2a. The extremities of the pin 10a extend through slots 3d provided in the spindle 3. The slots 3d are so disposed that the pin 10a may assume a position axially outward with respect to the center line of the reel, as shown by dotted lines in Fig. 8. The slide bar 10 is yieldably held in such position by means of a spring 11, in the manner illustrated in Fig. 8. The pin 10a by reason of its engagement with the bolt 5 holds the slide bar 10 in its extended position against the action of the spring 11.

The above-described trip mechanism is adapted to actuate a switch structure. A bracket 12 is secured to the bearing A1 of the reel casing or housing A and extends rearwardly therefrom past the extended rearward end of the spindle 3. The extremity of the bracket 12 supports a switch casing 13. A pin 14 extends transversely through the switch casing at approximately its central portion and is adapted to journal a switch lever 15. One arm of the switch lever 15 is connected through a link 16 to a slide bar 17 which is slidably supported by the casing 13 and protrudes beyond the ends thereof. The slide bar 17 is provided with an upturned portion 17a adapted to be engaged by the rearward extremity of the slide bar 10. A spring 18 is so connected with the switch lever 15 that the slide bar 17 is held in yieldable contact with the slide bar 10. The switch lever 15 carries a pair of contactors 19 which are adapted to coact with contact brackets 20 so as to complete a circuit therethrough. When the switch lever is in either of its extreme positions the contactors and contact brackets are separated; thus these members only make contact while the switch lever is shifting from one position to the other. In order to retard the movement of the switch lever, a cylinder 21 is provided in which fits a piston 22 joined by means of a connecting rod 23 to an end of the switch lever. A suitable small air relief port 21a is provided in or adjacent the head portion of the cylinder 21. The switch structure illustrated in Figs. 8, 11, and 12, is connected in series with the safety switch mechanisms illustrated in Figs. 13 and 14. The safety switch mechanism includes a casing 24 in which is slidably mounted a plunger or sliding pin 25. The casing 24 is mounted on the side of the reel housing A in such a manner that the extended end of the sliding pin 25 is engageable by the hinge A3 which supports the door A2 of the reel housing. The plunger is yieldably held against said hinge A3 by means of a spring 26. The plunger or sliding pin 25 is provided with a contact engaging lug 27 formed of insulating material and arranged to engage a spring contact 28 so as to force it against a contact 29 when the door A2 is closed. That is, when the sliding pin 25 is moved inwardly against the action of the spring 26. Thus, when the door A2 is open the contacts 28 and 29 separate.

Each projector is provided with an operating mechanism for the change-over apparatus. Each operating mechanism includes a casing 30 into which extends a driving shaft 31. The casing 30 in addition to enclosing the operating mechanism also forms a frame for supporting the various elements thereof, part of which include bearing portions 30a for said driving shaft 31. The driving shaft is connected through suitable flexible connecting means 32 to the shutter shaft C of the projector, as shown in Fig. 2. The casing 30 is supported by any suitable means above and to one side of the shutter D.

The driving shaft 31 is provided within but near the lower end of the casing 30 with a driving worm 33 which engages a worm gear 34a of small diameter which forms a part of a counter shaft 34. In addition to the worm gear 34a the counter shaft 34 is provided with a worm 34b. A driven shaft 35 is supported transversely with respect to the casing 30 and over the worm 34b. The driven shaft 35 is provided with a polygonal sectioned portion 35a upon which is slidably mounted a sliding gear 36 arranged to engage the worm 34b. The sliding gear 36 is yieldably held in engaged relation with the worm 34b by means of a spring 37.

The sliding gear is shifted by the combined action of a pair of operating levers 38 and 39. These levers are journalled intermediate their ends upon a pin 40 which in turn is supported by suitable means forming a part of the casing 30. The levers 38 and 39 are mounted above the driven shaft 35. The upwardly directed arm, designated 38a, of the lever 38 is provided near its extremity with a connecting portion 38b which extends arcuately therefrom and through a slot 39a provided in the upwardly directed arm 39b of the lever 39. The extremity of the connecting portion 38b is provided with a lug 38c which limits the relative movement of the two levers. A spring 41 yieldably holds the arms 38a and 39b in their separated relation.

The other or lower arm, designated 38d, of the lever 38 is bifurcated so as to straddle the driven shaft 35 and engage the sliding gear 36 on the side thereof opposite from the spring 37.

The upper end of the arm 39b is adapted to engage a catch lug 42a which extends downwardly from a catch member 42. The catch member is journalled at one extremity from suitable brackets forming a part of the casing and frame 30. The catch member 42 is normally held upon the lever 39 by means of a spring 43. Said catch member is drawn upwardly so as to release the lever 39 by means of a pair of magnets 44. These magnets are connected in series with the switch structure, that is, the contacts 20 thereof, and with the safety switch mechanism, namely the contacts 28 and 29 thereof. Thus operation of the trip mechanism when the door of the reel housing is closed completes a circuit through the magnet coils 44 so as to actuate the catch lever 42 and release the lever 39, as well as the lever 38 connected therewith; whereupon the sliding gear 36 is free to move from the solid line position shown in Fig. 5 to the dotted line position shown therein.

It will be here noted that the spring 43 is stronger than the spring 37 so as to hold the arms 38a and 39b in their extended relation against the action of the spring 37.

The other or remaining arm, designated 39c, of the lever 39 extends in angular relation with the arm 39b and along the upper side of the driven shaft 35. The extended portion of the arm 39c is adapted to be engaged by a cam 45. The cam is arranged to shift the lever 39 from the dotted line position shown in Fig. 5 to the solid line position shown therein, or, with reference to Fig. 6, from the solid to the dotted line position, thereby causing the lever 39 to re-engage the catch lug 42a. The lower extremities of the arm 38d of the lever 38 are adapted to be engaged by catch portions 46a formed near the extremity of a retaining lever 46. The retaining lever 46 extends underneath the counter shaft 34 and is journalled from suitable brackets extending from a wall of the casing 30. Said retaining lever is yieldably held in its raised position by means of a spring 47 and is adapted to be depressed against the action of said spring by means of a releasing cam 48 mounted upon the driven shaft 35. Thus when the magnet 44 releases the levers 38 and 39, the spring 37 shifts the sliding gear 36 and levers 38 and 39 to the dotted line position shown in Fig. 5, (which is the solid line position shown in Fig. 6. Thereupon action of the cam 45 re-sets the lever 39. However, prior to this action, the cam 48 has released the lever 46 so that the lever 38 is prevented from shifting. Hence the lever 39 shifts to its dotted line position shown in Fig. 6, but the lever 38 remains fixed until the cam 48 releases the lever 46, whereupon, the action of the spring 43 being stronger than the spring 37 said lever 38 throws the sliding gear 36 clear and free from the worm 33. In other words, operation of the magnet 44 causes the shaft 34 to be driven by the shaft 31 until said shaft 35 has made one complete revolution, whereupon said shaft 35 is disengaged from the shaft 31. This movement of the shaft 35 is for the purpose of actuating the control switch mechanism.

Each control switch mechanism includes a casing 49 which is fastened to a side of the casing 30. Said casing 49 is preferably formed of insulating material. The shaft 35 protrudes into the casing 49 and is arranged to receive a contact wheel 50. The contact wheel comprises an insulated hub portion 50a upon which is mounted at the rear side thereof an annular contact portion 50b of conducting material. Forwardly of the contact portion 50b the hub portion 50a extends outwardly so as to form an insulated periphery 50c. A narrow radially extending slot is provided in this portion of the wheel in which fits an axial extension 50d of the contact portion. A grounding contactor 51 is adapted to ride on the contact portion 50b, while a motor starting contactor 52, a douser and sound switching contactor 53, and motor stopping contactor 54 are adapted to ride upon the insulated periphery 50c and make contact in a predetermined successive order with the lug or projection 50d. The operating mechanism is arranged so that the contact segment or lug 50d stops just before engaging the motor starting contactor 52. Thus the segment 50d first grounds the contact 52, then the contactor 53, then the contactor 54. The various contactors are connected with a plurality of terminals 55 provided in the upper portion of the casing 49; there being also provided a terminal or two for the magnet 44 so as to facilitate easy connection of the control switch mechanism and magnet 44 with the various other units of the apparatus.

In the diagrammatical view, Fig. 1, the portion bearing the numeral I represents the part of the apparatus associated with the first projector, while the other portion, designated by the numeral II, represents the part of the apparatus associated with second projector.

It is preferred to operate the switch structure, the safety switch and the control mechanism of each projector upon a low voltage circuit and also to arrange these units so that they may be rendered inoperative whereby the change-over may be accomplished manually if desired, as in case of emergency. For this purpose there is provided a main switch 56 and a transformer 57, as shown in Fig. 1.

The motors of the two projectors are controlled by electrically operated motor switches 58 and 59. These switches include contact portions 58a and 59a, respectively, which are acted upon by armatures 58b and 59b, respectively. Said armatures are shifted in one direction so as to permit the contacts to close by means of closing coils 58c and 59c, respectively, and are shifted so as to open said switch portions by opening coils 58d and 59d, respectively. The closing coil 59c is operated by the contactor 52 forming a part of the control mechanism associated with projector I, while the closing coil 58c is operated by the contactor 52 associated with projector II.

The contractors 54 are adapted to operate the projectors with which they are associated, that is, the contactor 54 forming a part of the control switch associated with projector I operates the opening coil 58d, whereas the other contactor 54 associated with projector II operates the opening coil 59d.

Momentary acting switches 60 and 61 are provided which are associated with the projectors I and II, respectively, through the contactors 53. The switches 60 and 61 operate electrically controlled dousers 62 and 63, as well as an electrically controlled sound change-over switch 64. The dousers 62 and 63 may be especially constructed so as to operate on the low voltage provided by the transformer 57 in which case the switches 60 and 61 may be omitted and the leads which are shown connected to these switches may be joined directly to the dousers. This is also true of the sound change-over switch 64. However, most projectors are already provided with remotely controlled dousers arranged to operate on the normal voltage available. This being the case, it is preferred to interpose the switches 60 and 61. The dousers are provided with dual coils, that is, opening coils 62a and 63a, respectively, and closing coils 62b and 63b, respectively. These coils actuate armatures 62c and 63c, which in turn operate gate members 62d and 63d, respectively. The gate members are arranged in the path of the light rays focused against the film so as to cut off the light thereto. The opening coil 62a and the closing coil 63b are arranged in parallel with each other and in series with the switch 60, while the opening coil 63a and closing coil 62b are arranged in parallel with each other and in series with the switch 61. Thus operation of the control switch through contactors 53 of projector II closes switch 60 so as to open the douser of projector I and close the douser of projector II.

The electrically controlled change-over switch 64 is also a dual coil switch, one coil, designated 64a, being connected in series with the switch 60, while the other coil, designated 64b, is connected in series with the switch 61. The coils 64a and 64b operate an armature 64c which throws a lever 64d so as to engage either a set of contacts 64e or 64f. The sets of contacts 64e and 64f are associated, respectively, with the sound amplifier of projector I and amplifier of projector II, whereby the sound is changed from one machine to the other at the same time the film is changed.

In summation: the operation of our apparatus is as follows: Assume that projector I is running and that the next reel of film is arranged in the projector II and the arc lamp or other source of light is in readiness. When a predetermined point in the film is reached, the trip lever 8 is released whereby the trip mechanism allows the contactors 19 and contact brackets 20 to coact. Inasmuch as the door of the reel housing must be closed when the projector is running, operation of the trip mechanism causes the magnet 44 to release the levers 38 and 39 whereby the operating mechanism revolves the contact wheel 50. Movement of the contact wheel 50 of projector I first coacts with contactor 52 and closes the switch 59 of the motor associated with projector II, then coacts with contactor 53 and through switch 61 (or directly) opens douser 63 and closes douser 62, whereby the film of projector II is put in operation, and then said wheel 50 coacts with contactor 54 to shut off the motor of projector I. While the mechanism, including the shutter shaft C, of projector I is coasting to a stop, the contact wheel 50 completes its single revolution and the operating mechanism is re-set.

While projector II is running, the projectionist winds the new reel of film upon the reel of projector I, taking care to re-set the trip lever 8 at the proper place, the film commencing at a predetermined place on the reel and being wound a certain number of convolutions before placing the trip lever 8. The projectionist then places the reel in the reel housing of projector I in the usual manner. It will be noted that it is immaterial, as far as the trip mechanism is concerned, which side of the reel is first inserted into the reel casing as the sliding pin of the bolt member is centered. The only other act required of the projectionist is to prepare the arc lamp. In this connection it will be noted that the illuminating means of the projectors also may be controlled by our apparatus if such means be of a type which merely requires the throwing of a switch.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a change-over apparatus for motion picture projectors, a reel casing, a hollow tension spindle extending therein, a switch operating bar slidably mounted in said spindle, a switch operated thereby, a key extending from said bar through a slot in said spindle, a reel having a hub, a keyway therein arranged to fit said spindle and receive said key, a trip means including a trip element adapted to be inserted between convolutions of a film wound upon said reel, and a catch connected with said trip element and extending into said keyway when said trip element is retained by said film and withdraw therefrom when said trip element is released, said catch adapted to engage said key and shift said switch operating bar upon positioning said reel in said casing, and yieldable means for shifting said switch operating bar upon withdrawal of said catch so as to actuate said switch.

2. In a change-over apparatus for motion picture projectors, a reel casing, a hollow tension spindle extending therein, a switch operating bar slidably mounted in said spindle, a switch operated thereby, a key extending from said bar through a slot in said spindle, a reel having a hub, a keyway therein arranged to fit said spindle and receive said key, a trip means including a trip element adapted to be inserted between convolutions of a film wound upon said reel, and a catch connected with said trip element and extending into said keyway when said trip element is retained by said film and withdraw therefrom when said trip element is released, said catch adapted to engage said key and shift said switch operating bar upon positioning said reel in said casing, yieldable means for shifting said switch operating bar upon withdrawal of said catch so as to actuate said switch, said reel casing having a door, a switch mechanism mounted on said casing and including an element associated with said door whereby said switch mechanism is closed only when said door is closed, said switch mechanism and said switch being in series whereby said switch is rendered ineffective when the door of said casing is open.

3. In a change-over apparatus for motion picture projectors wherein the projector includes a film feeding reel and a hollow spindle therefor, a trip means comprising, a trip element mounted on the reel adapted to be held between convolutions of a film wound thereon, a switch operating bar carried by the hollow spindle, a switch connected with said operating bar, releasable catch means connecting said trip element with said operating bar for holding said switch in its open position while said trip element is retained by said film, and means for shifting said switch to its closed position upon release of said operating bar.

4. In a change-over apparatus for motion picture projectors wherein the projector includes a reel casing having a door, a film feeding reel therein and a hollow spindle for the reel, the combination with the casing, door, reel and spindle of a trip means comprising, a trip element mounted on the reel adapted to be held between convolutions of a film wound thereon, a switch operating bar carried by the hollow spindle, a switch connected with said operating bar, releasable catch means connecting said trip element with said operating bar for holding said switch in its open position while said trip element is retained by said film, means for shifting said switch to its closed position upon release of said operating bar, and a switch mechanism mounted on the casing and including an element associated with its door whereby said switch mechanism is closed only when said door is closed, said switch mechanism and said switch being in series whereby said switch is rendered ineffective when the door of said casing is open.

5. In motion picture projectors of the class wherein a pair of projectors are operated alternately and their operation is controlled by electric motors and dousers, and change-over from one to the other projector is effected by starting the motor of the other projector, then opening its douser and closing the douser of the one projector simultaneously, and then stopping the motor of the one projector, and wherein each projector includes a film feeding reel, the combination with said motors and dousers and film feeding reels, of a multiple contact switch for each projector including sequentially operable switch elements electrically associated with the motors and dousers of both projectors to effect a change-over from the corresponding to the other projector, means for operating said multiple contact switches, a clutch interposed between each multiple contact switch and its operating means, and a trip mechanism for each projector including a trip element incorporated in said film feeding reel and adapted to be released when the film is almost unwound from the feeding reel, and means associating the trip element with the clutch to set the clutch upon operation of the trip element, whereupon the multiple control switch is actuated by its operating means.

6. In motion picture projectors of the class wherein a pair of projectors are operated alternately and their operation is controlled by electric motors and dousers, and change-over from one to the other projector is effected by starting the motor of the other projector, then opening its douser and closing the douser of the one projector simultaneously, and then stopping the motor of the one projector, and wherein each projector includes a film feeding reel, the combination with said motors and dousers and film supplying reels, of a multiple contact switch for each projector including sequentially operable switch elements electrically associated with the motors and dousers of both projectors to effect a change-over from the corresponding to the other projector, means for operating said multiple contact switches, a clutch interposed between each multiple contact switch and its operating means, and a trip mechanism for each projector including a trip element incorporated in said film feeding reel and adapted to be released when the film is almost unwound from the feeding reel, means associating the trip element with the clutch to set the clutch upon operation of the trip element, whereupon the multiple control switch is actuated by its operating means, and a clutch releasing device connected with said multiple contact switch and clutch to release the clutch upon operation of said multiple contact switch for a predetermined interval.

7. In motion picture projectors of the class wherein a pair of projectors are operated alternately and their operation is controlled by electric motors and dousers, and change-over from one to the other projector is effected by starting the motor of the other projector, then opening its douser and closing the douser of the one projector simultaneously, and then stopping the motor of the one projector, the combination with said motors and dousers, of a multiple contact switch for each projector including sequentially operable switch elements electrically associated with the motors and dousers of both projectors to effect a change-over from the corresponding to the other projector, means for operating said multiple contact switches, a clutch interposed between each multiple contact switch and its operating means, a special film feeding reel and spindle therefor incorporated in each projector, a device including a lever adapted to be inserted between convolutions of a film wound upon the reel, yieldable means tending to shift the lever clear of the film upon unwinding of the covering layer of film therefrom, means responsive to said lever extending therefrom through said spindle, and an instrumentality operatively connecting said lever responsive means with said clutch to set the clutch upon release of said lever by the film whereupon the multiple contact switch is actuated by its operating means.

8. In motion picture projectors of the class wherein a pair of projectors are operated alternately and their operation is controlled by electric motors and dousers, and change-over from one to the other projector is effected by starting the motor of the other projector, then opening its douser and closing the douser of the one projector simultaneously, and then stopping the motor of the one projector, the combination with said motors and dousers, of a multiple contact switch for each projector including sequentially operable switch elements electrically associated with the motors and dousers of both projectors to effect a change-over from the corresponding to the other projector, means for operating said multiple contact switches, a clutch interposed between each multiple contact switch and its operating means, a special film feeding reel and spindle therefor incorporated in each projector, a device including a lever adapted to be inserted between convolutions of a film wound upon the reel, yieldable means tending to shift the lever clear of the film upon unwinding of the covering layer of film therefrom, means responsive to said lever extending therefrom through said spindle, a switch included in said lever responsive means, a solenoid in a circuit with said switch, a catch operated by the solenoid to set the clutch whereupon the multiple contact switch is actuated by its operating means upon release of said lever.

9. In motion picture projectors of the class wherein a pair of projectors are operated alternately and their operation is controlled by electric motors and dousers, and change-over from one to the other projector is effected by starting the motor of the other projector, then opening its douser and closing the douser of the one projector simultaneously, and then stopping the motor of the one projector, and wherein each projector includes a film feeding reel casing and door therefor, the combination with said motors, dousers and film feeding reel casing and door, of a multiple contact switch for each projector including sequentially operable switch elements electrically associated with the motors and dousers of both projectors to effect a change-over from the corresponding to the other projector, means for operating said multiple contact switches, a clutch interposed between each multiple contact switch and its operating means, a special film feeding reel and spindle therefor incorporated in each projector, a device including a lever adapted to be inserted between convolutions of a film wound upon the reel, yieldable means tending to shift the lever clear of the film upon unwinding of the covering layer of film therefrom, means responsive to said lever extending therefrom through said spindle, a switch included in said lever responsive means, a second switch in series therewith and associated with the casing and its door, said second switch being open when the door is open, and a solenoid in a circuit with said switches adapted to be energized when said switches are closed, a catch means responsive to said solenoid to set said clutch whereupon the multiple contact switch is actuated by its operating means upon energizing of said solenoid.

10. In motion picture projectors of the class wherein a pair of projectors are operated alternately and their operation is controlled by electric motors and dousers, and change-over from one to the other projector is effected by starting the motor of the other projector, then opening its douser and closing the douser of the one projector simultaneously, and then stopping the motor of the one projector, the combination with said motors and dousers, of a multiple contact switch for each projector including sequentially operable switch elements electrically associated with the motors and dousers of both projectors to effect a change-over from the corresponding to the other projector, means for operating said multiple contact switches, a clutch interposed between each multiple contact switch and its operating means, a special film feeding reel and spindle therefor incorporated in each projector, a device including a lever adapted to be inserted between convolutions of a film wound upon the reel, yieldable means tending to shift the lever clear of the film upon unwinding of the covering layer of film therefrom, means responsive to said lever extending therefrom through said spindle, an instrumentality operatively connecting said lever responsive means with said clutch to set the clutch upon release of said lever by the film whereupon the multiple contact switch is actuated by its operating means, and clutch releasing device connected with said multiple contact switch and clutch to release the clutch upon operation of said multiple contact switch for a predetermined interval.

11. In motion picture projectors of the class wherein a pair of projectors are operated alternately and their operation is controlled by electric motors and dousers, and change-over from one to the other projector is effected by starting the motor of the other projector, then opening its douser and closing the douser of the one projector simultaneously, and then stopping the motor of the one projector, and wherein each projector includes a film feeding reel casing and door therefor, the combination with said motors, dousers and film feeding reel casing and door, of a multiple contact switch for each projector including sequentially operable switch elements electrically associated with the motors and dousers of both projectors to effect a change-over from the corresponding to the other projector, means for operating said multiple contact switches, a clutch interposed between each multiple contact switch and its operating means, a special film feeding reel and spindle therefor incorporated in each projector, a device including a lever adapted to be inserted between convolutions of a film wound upon the reel, yieldable means tending to shift the lever clear of the film upon unwinding of the covering layer of film therefrom, means responsive to said lever extending therefrom through said spindle, a switch included in said lever responsive means, a second switch in series therewith and associated with the casing and its door, said second switch being open when the door is open, and a solenoid in a circuit with said switches adapted to be energized when said switches are closed, a catch means responsive to said solenoid to set said clutch whereupon the multiple contact switch is actuated by its operating means upon energizing of said solenoid, and clutch releasing device connected with said multiple contact switch and clutch to release the clutch upon operation of said multiple contact switch for a predetermined interval.

12. In a motion picture projector, means for signalling the approach of the end of a film comprising, a special film feeding reel and hollow spindle therefor, said reel and spindle being revoluble, a lever mounted on the reel and adapted to be inserted between convolutions of a film wound thereon, a link extending from the lever to the spindle of the film, yieldable means tending to shift the lever clear and means responsive to the link and lever extending through the spindle.

13. In motion picture projectors of the class wherein a pair of projectors having motors and dousers are operated alternately and each projector incorporates automatic means having a cycle of operation wherein the motor of the opposite projector is started, then the douser of the opposite projector is opened and the douser of the corresponding projector is closed simultaneously and then the motor of the corresponding projector is stopped, the combination with each of said automatic means of a control comprising, a special film feeding reel and hollow spindle therefor, said reel and spindle being revoluble, a lever mounted on the reel and adapted to be inserted between convolutions of a film wound thereon, a link extending from the lever to the spindle of the film, yieldable means tending to shift the lever clear and means responsive to the link and lever extending through the spindle, means for driving each automatic means, a clutch interposed between each automatic means and its driving means, and an instrumentality operatively connecting said link and lever responsive means with said clutch to set the clutch upon release of said lever whereupon the corresponding automatic is actuated by its driving means.

WILLIAM F. KEMP.
PETER SHEARER.